(12) United States Patent
Sato et al.

(10) Patent No.: US 7,983,001 B2
(45) Date of Patent: Jul. 19, 2011

(54) SLIDER MOUNTED MAGNETIC HEAD HAVING A PERPENDICULAR RECORDING HEAD WITH A MAIN POLE HAVING A RUTHENIUM(RU) ELECTRODE FILM

(75) Inventors: Makoto Sato, Tokyo (JP); Atsushi Yamaguchi, Tokyo (JP); Masashi Sano, Tokyo (JP); Shingo Miyata, Tokyo (JP); Kenzo Makino, Tokyo (JP)

(73) Assignee: TDK Corporation, Tokyo (JP)

( * ) Notice: Subject to any disclaimer, the term of this patent is extended or adjusted under 35 U.S.C. 154(b) by 915 days.

(21) Appl. No.: 11/940,772

(22) Filed: Nov. 15, 2007

(65) Prior Publication Data

US 2009/0128952 A1   May 21, 2009

(51) Int. Cl.
 *G11B 5/127* (2006.01)
(52) U.S. Cl. .......................... 360/125.03; 360/125.06
(58) Field of Classification Search . 360/125.03–125.15
See application file for complete search history.

(56) References Cited

U.S. PATENT DOCUMENTS 7,518,824 B2 * 4/2009 Sasaki et al. ............. 360/125.09

FOREIGN PATENT DOCUMENTS

| JP | 2005-25890 | 1/2005 |
|----|-----------|--------|
| JP | 2006-253252 | 9/2006 |
| JP | 2006-269690 | 10/2006 |
| JP | 2006-309846 | 11/2006 |

* cited by examiner

*Primary Examiner* — A. J. Heinz
(74) *Attorney, Agent, or Firm* — Oblon, Spivak, McClelland, Maier & Neustadt, L.L.P.

(57) ABSTRACT

The present invention relates to a perpendicular recording magnetic head. A main magnetic pole film includes an electrode film and a plated magnetic film. The electrode film includes a Ru film and a conductive magnetic film, and the Ru film, which follows the shape of an inner wall surface of a recess formed in a first non-magnetic film, is adhered to the inner wall surface of the recess or a surface of a second non-magnetic film adhered thereto. The conductive magnetic film is adhered to a surface of the Ru film, thereby following the shape of the inner wall surface of the recess. The plated magnetic film is disposed adjacent the conductive magnetic film, thereby filling up the recess.

11 Claims, 14 Drawing Sheets

SLIDER MOUNTED MAGNETIC HEAD HAVING A PERPENDICULAR RECORDING HEAD WITH A MAIN POLE HAVING A RUTHENIUM(RU) ELECTRODE FILM

TECHNICAL FIELD

The present invention relates to a magnetic head, a head assembly, and a magnetic recording/reproducing apparatus.

BACKGROUND OF THE INVENTION

In the field of magnetic heads to be mounted on a magnetic recording apparatus such as a hard disk drive (HDD), recently, the recording method is being shifted from longitudinal recording to perpendicular recording in order to improve the recording density with respect to a magnetic recording medium such as a hard disk. The perpendicular recording method achieves high linear recording density and also has an advantage that the recording medium after recording becomes highly resistant to heat fluctuation.

A perpendicular recording magnetic head is provided with a coil film for generating a magnetic flux and a magnetic pole film for guiding the magnetic flux to a recording medium. The magnetic pole film is constituted by a plated film formed by electroplating on an electrode film 13 intended to function as a seed film.

In the meantime, improvement in recording capacity of a hard disk drive (HDD) requires not only to increase the track density by reducing the magnetic pole film width at the magnetic head but also to improve the recording resolution by increasing the coercive force of the medium.

In order to assure sufficient overwrite characteristic (OW) with respect to a medium of a high coercive force, the magnetic head must have a main magnetic pole film with a high saturation magnetic flux density. In the prior art, accordingly, a plated film forming a main portion of the main magnetic pole film is made of a high saturation magnetic flux density material, such as a FeCo material, a CoNiFe ternary alloy film, and a high saturation magnetic flux density material such as Fe, and FeN, and the electrode film intended to function as a seed film is also made of a high saturation magnetic flux density material. For example, Japanese Unexamined Patent Application Publication No. 2006-253252 discloses a main magnetic pole in which a FeCoNi plated film is formed on a FeCoNi electrode film. It describes that the saturation magnetic flux density (Bs) of the main magnetic pole reaches 2.4 T.

In the perpendicular recording magnetic head, however, merely increasing the saturation magnetic flux density is not sufficient, and it is also necessary to avoid the "pole erase" phenomenon in which a signal recorded on a magnetic recording medium by the main magnetic pole film becomes erased when recording is not performed.

In the perpendicular recording magnetic head, the main magnetic pole film for recording has its hard axis directed along an air bearing surface to perform recording in magnetization rotation mode. That is, residual magnetization along the air bearing surface is minimized to prevent an excess magnetic flux from being emitted when recording is not performed, thereby avoiding the pole erase. In order to assure this function, the coercive force Hc of the main magnetic pole film has to be kept low.

As means for avoiding the pole erase, Japanese Unexamined Patent Application Publication No. 2006-269690 discloses a technique of achieving not only a high saturation magnetic flux density Bs but also a low coercive force Hc by orienting the crystal of a FeCo alloy plated film in (110) with the FeCo alloy plated film formed on a non-magnetic conductive layer containing one or more elements selected from Ru, Rh, Ir, Cr, Cu, Au, Ag, Pt and Pd.

In order to deal with the improvement in recording capacity of the hard disk drive (HDD), on the other hand, it is required to increase the track density by reducing the main magnetic pole film width at the magnetic head, but since the main magnetic pole film width decreases with increasing the recording density of the magnetic recording, it is significantly important to control the width with high accuracy from the viewpoint of improving the yield of the magnetic head.

In the prior art, however, since the FeCo alloy plated film, which constitutes the main magnetic pole film, is formed on a planar non-magnetic conductive film, as disclosed in Japanese Unexamined Patent Application Publication No. 2006-269690, it has been difficult to control the main magnetic pole film width more accurately than the patterning accuracy of the photolithography technique or the like.

SUMMARY OF THE INVENTION

It is an object of the present invention to provide a perpendicular recording magnetic head which has a magnetic pole structure that enables high accuracy control of a main magnetic pole film width.

It is another object of the present invention to provide a perpendicular recording magnetic head which has a high overwrite characteristic and also has a magnetic pole structure that is effective in avoiding the problem of pole erase.

It is still another object of the present invention to provide a head assembly and a magnetic recording/reproducing apparatus using the above perpendicular recording magnetic head.

To achieve the above objects, a main magnetic pole film of a perpendicular recording head of a magnetic head according to the present invention includes an electrode film and a plated magnetic film and is formed within a recess disposed in a first non-magnetic film. The electrode film includes a Ru film, and the Ru film is adhered to an inner wall surface of the recess or a surface of a second non-magnetic film adhered thereto, thereby following a shape of the inner wall surface of the recess.

The electrode film further includes a conductive magnetic film, and the conductive magnetic film is adhered to a surface of the Ru film, thereby following the shape of the inner wall surface of the recess. The plated magnetic film is disposed adjacent the conductive magnetic film, thereby filling up the recess.

In the magnetic head of the present invention, at first, since the main magnetic pole film of the perpendicular recording head is formed within the recess disposed in the insulating film, as described above, controlling the width of the recess leads to controlling the width of the main magnetic pole film to be formed therein.

The main magnetic pole film includes the electrode film, and the electrode film includes the Ru film, and the Ru film is adhered to the inner wall surface of the recess or the surface of the second non-magnetic film adhered thereto. The electrode film further includes the conductive magnetic film, and the conductive magnetic film is adhered to the surface of the Ru film. With this film structure, the crystal of the conductive magnetic film formed on the Ru film can be oriented in (110) using (110) orientation of the Ru film. The crystal orientation control for (110) orientation with the Ru film can affect not only the conductive magnetic film but also the plated magnetic film formed thereon. Accordingly, the magnetic head can be improved in soft magnetic properties.

In addition, the Ru film is adhered to the inner wall surface of the recess, thereby following the shape of the inner wall surface of the recess, while the conductive magnetic film is adhered to the surface of the Ru film, thereby following the shape of the inner wall surface of the recess, as well. With this structure, the conductive magnetic film and the plated magnetic film are affected by the crystal orientation control for (110) orientation with the Ru film not only at a single face, i.e., the bottom face of the recess but also at both inner wall faces rising from the bottom face. Hence, the crystal orientation control with the Ru film effectively affects the conductive magnetic film and the plated magnetic film, unlike the case where a magnetic film is disposed on a planar Ru film.

Since the plated magnetic film occupying most of the volume of the main magnetic pole film is disposed adjacent the conductive magnetic film, thereby filling up the recess, the width of the main magnetic pole film is increased to a sum of the width of the plated magnetic film and the film thickness of the conductive magnetic film. Therefore, the width of a small width portion for emitting a perpendicular magnetic field can be increased by the conductive magnetic film at the front end of the main magnetic pole film, which contributes in improving the overwrite characteristic.

Moreover, the width of the small width portion for emitting a perpendicular magnetic field can be controlled with high accuracy by controlling the film thickness of the conductive magnetic film and the film thickness of the Ru film. Since the width of the small width portion for emitting a perpendicular magnetic field is controlled by controlling the width of the recess and then by controlling the film thickness of the conductive magnetic film and the film thickness of the Ru film, it can be controlled more accurately.

Since the electrode film, which functions as a conductor, i.e., a plating seed film for passing plating current at the time of plating the plated magnetic film, is a laminated film of the Ru film and the conductive magnetic film, it allows passage of sufficient plating current. Accordingly, there can be formed a high-quality plated magnetic film in a short period of time.

In order to reflect (110) orientation of the Ru film constituting the electrode film in the crystal orientation of the plated magnetic film, the Ru film preferably has a film thickness in the range of 0.75 nm to 5 nm. With this, there can be obtained a main magnetic pole film having excellent soft magnetic properties.

Magnetic heads of this type are generally of the complex type including the above perpendicular recording head and a reproducing head. As the reproducing head, there may be employed a giant magneto-resistive effect element (GMR) or a ferromagnetic tunnel junction element (TMR).

The present invention also discloses a head assembly and a magnetic recording/reproducing apparatus. The head assembly includes the above magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (or gimbal) and an HAA (head arm assembly) in which the HGA is mounted on an arm.

The magnetic recording/reproducing apparatus according to the present invention includes the above head assembly and a magnetic recording medium. A typical example of the magnetic recording/reproducing apparatus is a hard disk drive (HDD) using a magnetic recording medium called "hard disk".

The other objects, constructions and advantages of the present invention will be further detailed below with reference to the attached drawings. However, the attached drawings show only illustrative examples.

DESCRIPTION OF THE PREFERRED EMBODIMENTS

1. Magnetic Head

Figure 1:
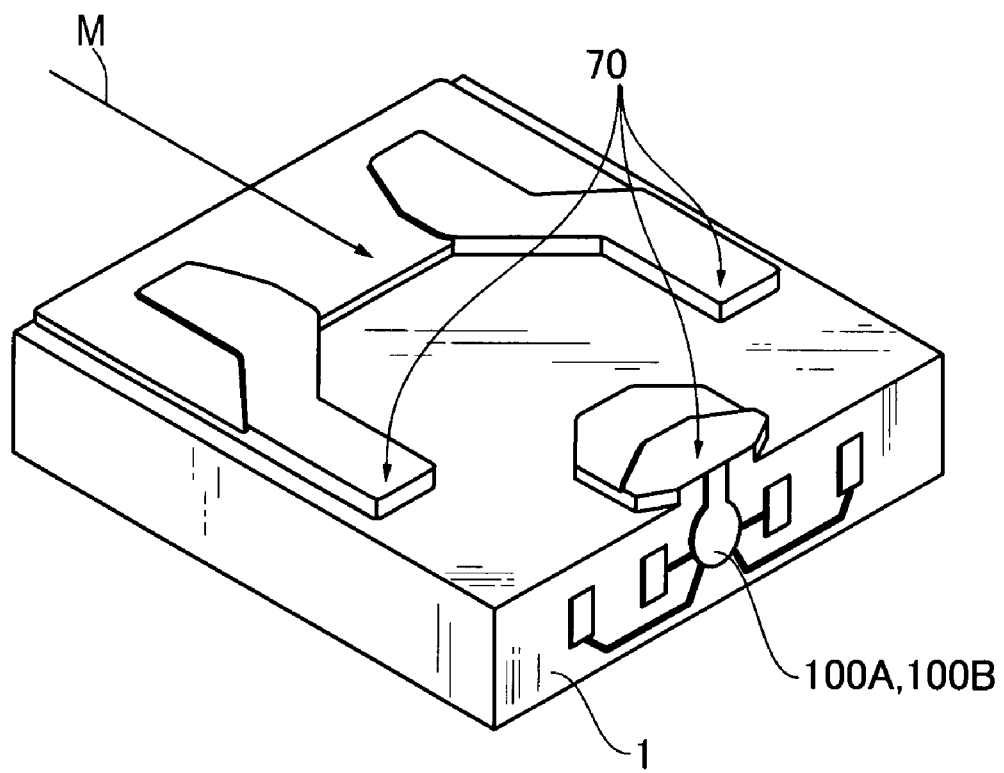
FIG. 1 is a perspective view of a magnetic head according to the present invention.
Figure 2:
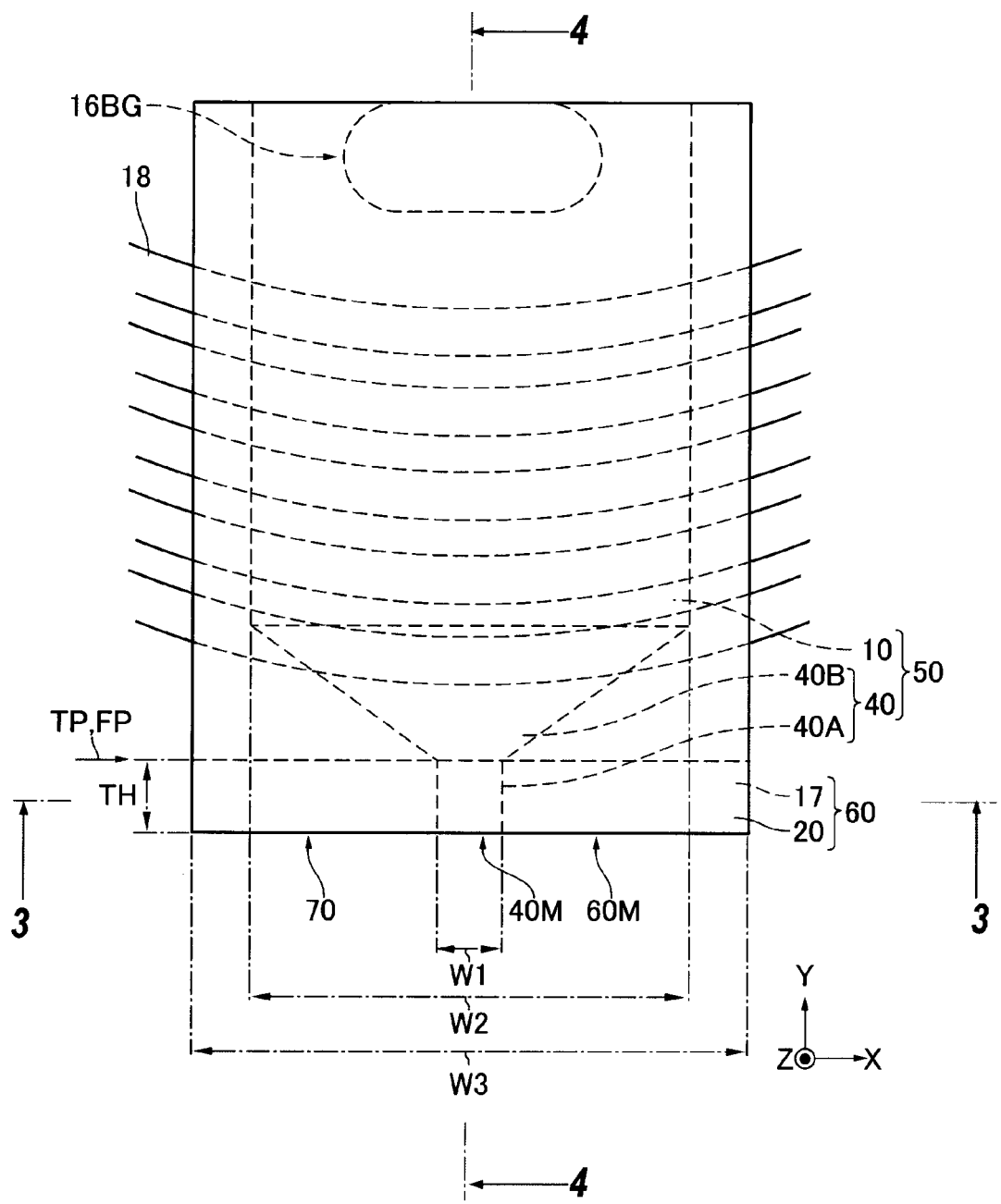
FIG. 2 is a plan view schematically showing a part of a perpendicular recording head contained in a magnetic head according to the present invention.
Figure 3:
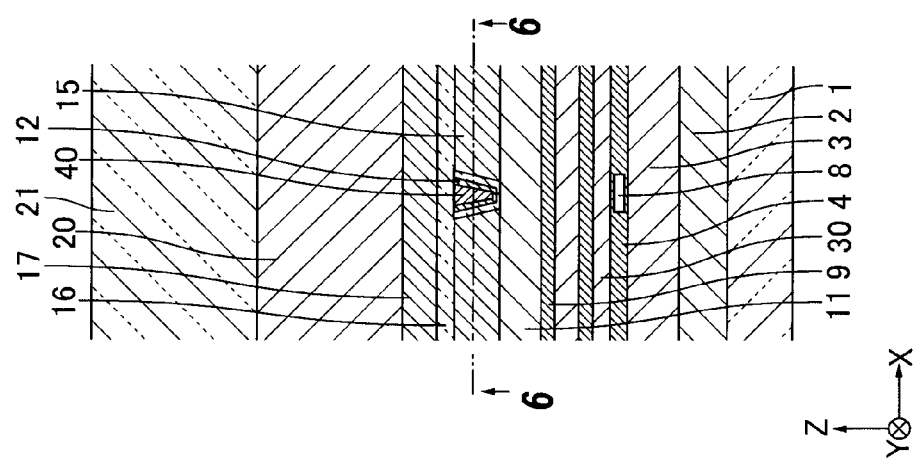
FIG. 3 is a sectional view taken along line 3-3 in FIG. 2.

FIGS. 1 to 3 show a magnetic head to be used in combination with a rapidly spinning magnetic recording medium such as a hard disk. Magnetic heads of this type are generally called "floating-type". However, the magnetic head according to the present invention is not necessarily required to be of the floating-type. For example, it may be a magnetic head which comes into contact with a magnetic recording medium.

Referring first to FIG. 1, the magnetic head includes a slider substrate 1 having a generally rectangular prism structure. The slider substrate 1 has an air bearing surface 70 directly related to the floating characteristics and is provided with a recording/reproducing head (100A, 100B) on its lateral end face located at an air flow-out side (or trailing edge side) with respect to an air flow direction M.

Figure 4:
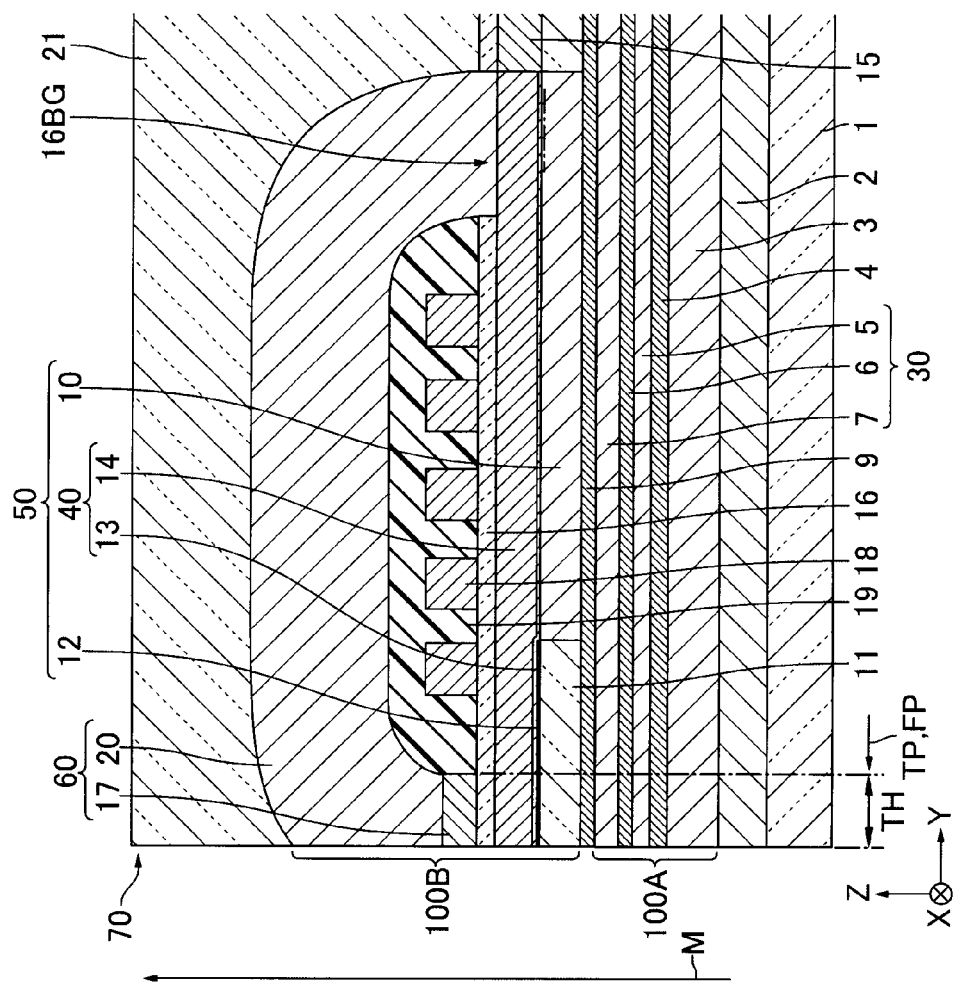
FIG. 4 is a sectional view taken along line 4-4 in FIG. 2.

Details of the recording/reproducing head (100A, 100B) are shown in FIGS. 2 to 4. In FIGS. 2 to 4, dimensions along X, Y and Z axes are called "width", "length" and "thickness/height", respectively. Along the Y axis, moreover, one side close to the air bearing surface 70 and the other side remote therefrom are designated by "front" and "rear", respectively, and being positioned forward and being positioned rearward are expressed by "project" and "recede", respectively.

The magnetic head shown in FIGS. 2 to 4 is a complex-type head which can perform both recording and reproducing. In the magnetic head, an insulating film 2, a reproducing head 100A using magneto-resistive effect (MR effect), a separating film 9, a recording head 100B for performing a recording process in a perpendicular recording method, and an overcoat film 21 are layered on a slider substrate 1 in the mentioned order.

The reproducing head 100A is formed, for example, by layering a lower read shield film 3, a shield gap film 4, and an upper read shield film 30 in the mentioned order. In the shield gap film 4, a reproducing head (or MR element 8) is embedded in such a manner as to be exposed on the air bearing surface 70. The air bearing surface 70 is uniquely defined with reference to one end face of the slider substrate 1 supporting a series of components from the insulating film 2 to the overcoat film 21, more specifically, refers to a surface containing one end face of the slider substrate 1.

Both the lower read shield film 3 and the upper read shield film 30 function to magnetically separate the MR element 8 from the surroundings and extend rearward from the air bearing surface 70. The lower read shield film 3 is made of, for example, a magnetic material such as a nickel-iron alloy (NiFe). In this case, the nickel-iron alloy (NiFe) may have a composition ratio of 80 wt. % of Ni and 20 wt. % of Fe. The upper read shield film 30 is formed, for example, by layering two upper read shield film portions 5, 7 with a non-magnetic film 6 interposed therebetween. Both the upper read shield film portions 5, 7 are made of, for example, a magnetic material such as a nickel-iron alloy. The non-magnetic film 6 is made of, for example, a non-magnetic material such as ruthenium (Ru) or alumina. The upper read shield film 30 is not necessarily required to have a layered structure but may have a single film structure of a magnetic material.

The shield gap film 4 functions to electrically separate the MR element 8 from the surroundings and is made of, for example, a non-magnetic insulating material such as alumina. The MR element 8 uses giant magneto-resistive effect (GMR) or tunneling magneto-resistive effect (TMR), for example.

The recording head 100B is a so-called shield-type perpendicular recording head including a non-magnetic film 11, a first non-magnetic film 15, a magnetic pole film 50, a gap film 16 with an opening (or back gap 16BG) for magnetic connection, a coil film 18 embedded in an insulating film 19, and a magnetic film 60.

The magnetic pole film 50 extends rearward from the air bearing surface 70 and includes an auxiliary magnetic pole film 10, a second non-magnetic film 12, and a main magnetic pole film 40.

The auxiliary magnetic pole film 10 extends from behind the air bearing surface 70 to the back gap 16BG. For example, the auxiliary magnetic pole film 10 is disposed on the leading side with respect to the main magnetic pole film 40 and has a rectangular plan shape (width W2), as shown in FIG. 2. The non-magnetic film 11 functions to electrically and magnetically separate the auxiliary magnetic pole film 10 from the surroundings and is made of, for example, a non-magnetic insulating material such as alumina.

Figure 5:
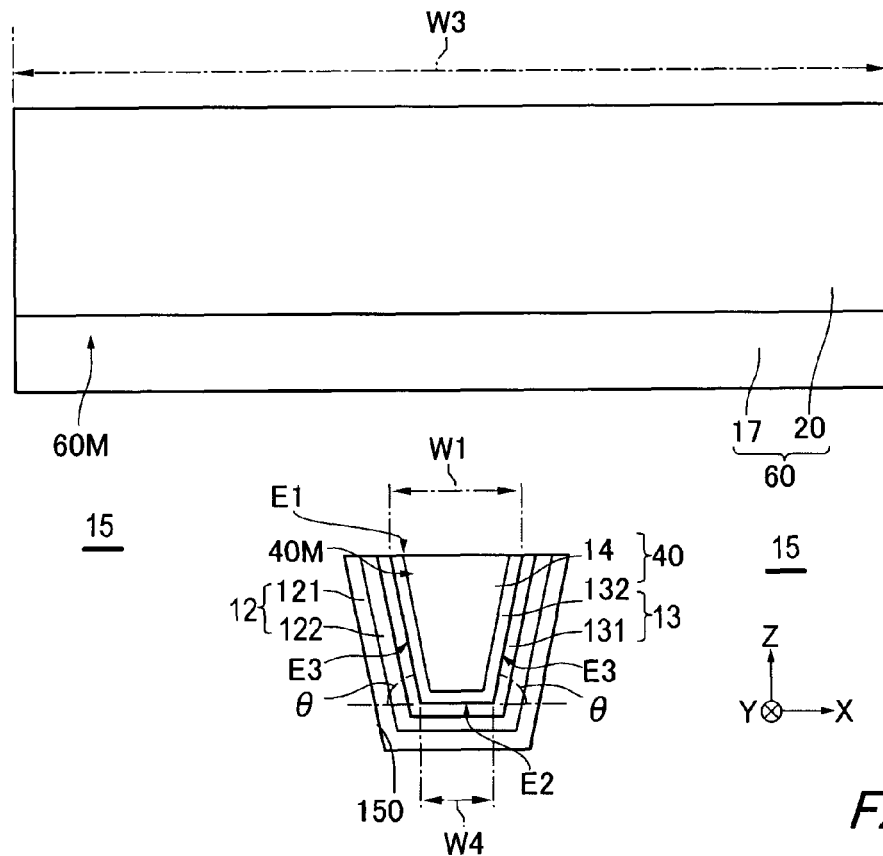
FIG. 5 is an end view showing a magnetic pole structure of the perpendicular recording head of the magnetic head shown in FIGS. 1 to 4.
Figure 6:
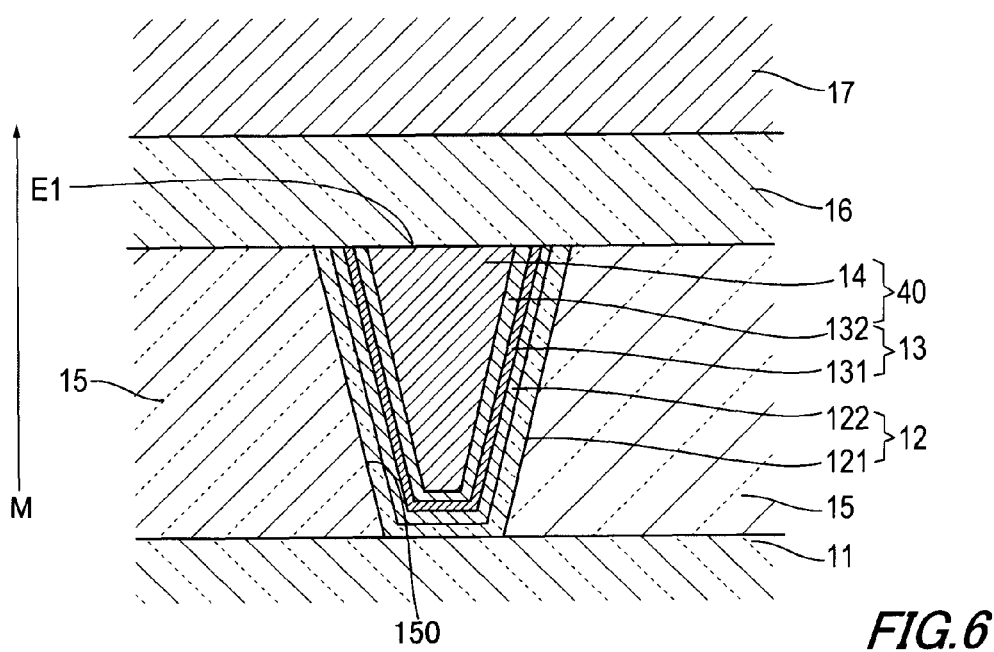
FIG. 6 is an enlarged sectional view at a magnetic pole portion.

For example, the second non-magnetic film 12 extends from the air bearing surface 70 to the forefront position of the auxiliary magnetic pole film 10 for connecting the auxiliary magnetic pole film 10 and the main magnetic pole film 40. The second non-magnetic film 12, which follows the shape of an inner wall surface of a recess 150 formed in the first non-magnetic film 15, is adhered to the inner wall surface of the recess 150. The sectional shape of the recess 150 parallel to the air bearing surface 70 increases in width toward the side of a trailing edge, as shown in FIGS. 5 and 6.

The second non-magnetic film 12 is, for example, a laminate of a non-magnetic film 121 formed by ALD and an adhesive film 122 formed thereon such as by sputtering. The non-magnetic insulating film 121 may be made of alumina or aluminium nitride, while the adhesive film 122 may be made of Ti.

The first non-magnetic film 15 functions to electrically and magnetically separate the main magnetic pole film 40 from the surroundings and is made of, for example, a non-magnetic insulating material such as alumina.

The first non-magnetic film 15 and the non-magnetic film 121 are each made of a non-magnetic insulating material but may have different compositions because of their different formation methods. More specifically, the first non-magnetic film 15 is formed such as by sputtering using an inert gas and contains the inert gas because of its formation method. It should be noted that examples of the inert gas include argon (Ar), krypton (Kr) and xenon (Xe).

On the other hand, the non-magnetic film 121, if formed by ALD not using any inert gas or the like, contains no inert gas because of its formation method. Whether it contains any inert gas or not can be determined by using a composition analysis method such as scanning transmission electron microscopy (STEM)—energy-dispersive X-ray spectroscopy (EDS).

The first non-magnetic film 15 and the non-magnetic film 121 are also different in the content of specific components because of their different formation methods. More specifically, since water and trimethyl aluminium (TMA) are used in ALD but not used in sputtering, the content of hydrogen (H) is larger in the non-magnetic film 121 than in the first non-magnetic film 15.

The main magnetic pole film 40 includes an electrode film 13 and a plated magnetic film 14 and extends from the air bearing surface 70 to the back gap 16BG. The main magnetic pole film 40 including the electrode film 13 and the plated magnetic film 14 is disposed in the recess 150 formed in the first non-magnetic film 15, as shown in FIGS. 5 and 6. The recess 150 has an inverted trapezoid shape, whose upper bottom and lower bottom are the longer side on the trailing side and the shorter side on the leading side, respectively.

The main magnetic pole film 40 includes, for example, the small width portion 40A extending rearward from the air bearing surface 70 and a large width portion 40B connected to the rear end of the small width portion 40A, as shown in FIG. 2.

The small width portion 40A is a substantial magnetic flux emitting portion (so-called magnetic pole film) and has a constant width W1 which defines the recording track width. The large width portion 40B is a portion intended to supply a magnetic flux to the small width portion 40A and has a width W2 larger than the width W1. The width of the large width portion 40B decreases in its front portion toward the small width portion 40A. The position where the width of the main magnetic pole film 40 starts to increase from the width W1 to the width W2 is a so-called flare point FP.

An end face 40M of the main magnetic pole film 40 on the side close to the air bearing surface 70 is of, for example, an inverted trapezoid shape, whose upper bottom and lower bottom are the longer side on the trailing side and the shorter side on the leading side, respectively, as shown in FIG. 5. This trapezoid shape follows the shape of the inner wall surface of the recess 150. Concretely, the end face 40M has a shape defined by an upper end edge E1 (width W1) on the trailing side, a lower end edge E2 (width W4) on the leading side, and two side edges E3, wherein the width W4 is smaller than the width W1. The upper end edge E1 is a substantial recording portion and its width W1 is approximately 0.2 μm or less. The bevel angle θ of the end face 40M (or angle between a direction along which the lower end edge E2 extends and the side edge E3) may be set arbitrarily, for example, within the range of less than 90 degrees.

The gap film 16 is a gap for magnetically separating the magnetic pole film 50 and the magnetic film 60 and is made of, for example, a non-magnetic insulating material such as alumina or a non-magnetic conductive material such as ruthenium. The thickness of the gap film 16 is approximately 0.03 to 0.1 μm.

The coil film 18 functions to generate a magnetic flux and is made of, for example, a highly conductive material such as copper (Cu). The coil film 18 is wound around the back gap 16BG to have a winding structure (or spiral structure), as shown in FIG. 2.

The insulating film 19 functions to electrically separate the coil film 18 from the surroundings and is made of, for example, a non-magnetic insulating material such as a photoresist or a spin on glass (SOG: Spin on Glass) which becomes fluid when heated. The forefront position of the insulating film 19 is a throat height zero position TP, and the distance between the throat height zero position TP and the air bearing surface 70 is a so-called "throat height TH". FIG. 2 shows a state where the throat height zero position TP matches the flare point FP.

The magnetic film 60 functions to absorb a spreading component of a magnetic flux emitted from the magnetic pole film 50 so as to increase the gradient of the perpendicular magnetic field and also absorb a magnetic flux returning from the recording medium so as to circulate the magnetic flux between the recording head 100B and a recording medium. The magnetic film 60, which extends rearward from the air bearing surface 70 on the trailing side of the magnetic pole film 50, is separated from the magnetic pole film 50 by the gap film 16 at its front but connected to the magnetic pole film 50 through the back gap 16BG at its rear. On the side close to the air bearing surface 70, the magnetic film 60 has an end face 60M which is, for example, of a rectangular shape having a width W3 larger than the width W1, as shown in FIG. 2. The magnetic film 60 includes, for example, a write shield film 17 and a return yoke film 20 which are distinct from each other.

The write shield film 17 functions to mainly increase the gradient of the perpendicular magnetic field and is made of, for example, a high saturation magnetic flux density material such as a nickel-iron alloy or an iron-based alloy. Particularly by absorbing a spreading component of a magnetic flux emitted from the magnetic pole film 50, the write shield film 17 functions to: (1) increase the magnetic field gradient of the perpendicular magnetic field; (2) decrease the recording width; and (3) incorporate an oblique magnetic field component into the perpendicular magnetic field. However, the write shield film 17 may additionally function to circulate the magnetic flux like the return yoke film 20. The write shield film 17 is adjacent to the gap film 16 and extends rearward from the air bearing surface 70 to have its rear end adjacent to the insulating film 19. Thus, the write shield film 17 serves to define the forefront position (throat height zero position TP) of the insulating film 19.

The return yoke film 20 functions to circulate the magnetic flux and is made of, for example, a magnetic material similar to that of the write shield film 17. The return yoke film 20 extends from the air bearing surface 70, through above the insulating film 19, to the back gap 16BG on the trailing side of the write shield film 17 and is connected to the write shield film 17 at its front but to the magnetic pole film 50 at its rear through the back gap 16BG, as shown in FIG. 4.

The overcoat film 21 functions to protect the magnetic head and is made of, for example, a non-magnetic insulating material such as alumina.

Next will be described the main magnetic pole film 40, which is a feature of the present invention, mainly referring to FIGS. 5 and 6. Of the electrode film 13 and the plated magnetic film 14 included in the main magnetic pole film 40, the electrode film 13 is a plating seed film to be used for growing the plated magnetic film 14. The present invention is characterized by the film configuration of the electrode film 13. That is, at first, the electrode film 13 includes the Ru film (ruthenium film) 131. The Ru film 131 is adhered to the inner wall surface of the recess 150 or the surface of the second non-magnetic film 12 adhered thereto, thereby following the shape of the inner wall surface of the recess 150. More specifically, the Ru film 131 is adhered to the surface of the adhesive film 122 included in the second non-magnetic film 12, thereby increasing the adhesion strength of the electrode film 13 to the second non-magnetic film 12.

The electrode film 13 further includes a conductive magnetic film 132. The conductive magnetic film 132 is adhered to the surface of the Ru film 131, thereby following the shape of the inner wall surface of the recess 150. The conductive magnetic film 132 is made of a magnetic material having a high saturation magnetic flux density, and its material composition may be identical to or different from that of the plated magnetic film 14.

The plated magnetic film 14 is disposed adjacent the conductive magnetic film 132 and grown thereon to fill up the recess 150. The plated magnetic film 14 may be made of a high saturation magnetic flux density material, such as a FeCo material, a CoNiFe ternary alloy film, and a high saturation magnetic flux density material such as Fe, and FeN.

In the magnetic head of the present invention, at first, since the main magnetic pole film 40 of the perpendicular recording head 100B is formed within the recess 150 disposed in the first non-magnetic film 15, as described above, controlling the width of the recess 150 leads to controlling the width of the main magnetic pole film 40 formed therein.

The main magnetic pole film 40 includes the electrode film 13, and the electrode film 13 includes the Ru film 131, and the Ru film 131 is adhered to the inner wall surface of the recess 150 or the surface of the second non-magnetic film 12 adhered thereto, thereby following the shape of the inner wall surface of the recess 150. The electrode film 13 further includes the conductive magnetic film 132, and the conductive magnetic film 132 is adhered to the surface of the Ru film 131, thereby following the shape of the inner wall surface of the recess 150.

With this film structure, (110) orientation of the Ru film 131 enables the crystal of the conductive magnetic film 132, which is formed thereon as a FeCo alloy film or the like, to be oriented in (110) and further enables the crystal of the plated magnetic film 14, which is grown thereon by plating, to be oriented in (110). Accordingly, the magnetic head can be improved in soft magnetic properties.

In addition, the Ru film 131 is adhered to the inner wall surface of the recess 150, thereby following the shape of the inner wall surface of the recess 150, while the conductive magnetic film 132 is adhered to the surface of the Ru film 131, thereby following the shape of the inner wall surface of the recess 150, as well. With this structure, the conductive magnetic film 132 and the plated magnetic film 14 are affected by the crystal orientation control for (110) orientation with the Ru film 131 mainly at both inner wall faces rising from the bottom face. Hence, the crystal orientation control with the Ru 131 film effectively affects the conductive magnetic film 131 and the plated magnetic film 14, unlike the case where a magnetic film is disposed on a planar Ru film.

Since the plated magnetic film 14 occupying most of the volume of the main magnetic pole film 40 is disposed adjacent the conductive magnetic film 132, thereby filling up the recess 150, the width of the main magnetic pole film 40 is increased to a sum of the width of the plated magnetic film 14 and the film thickness of the conductive magnetic film 132. Therefore, the width of the small width portion 40A for emitting a perpendicular magnetic field can be increased by the conductive magnetic film 132 at the front end of the main magnetic pole film 40, which contributes in improving the overwrite characteristic.

Moreover, the width of the small width portion 40A for emitting a perpendicular magnetic field can be controlled with high accuracy by controlling the film thickness of the conductive magnetic film 132 and the film thickness of the Ru film 131. Since the width of the small width portion 40A for emitting a perpendicular magnetic field is controlled by controlling the width of the recess 150 and then by controlling the film thickness of the conductive magnetic film 132 and the film thickness of the Ru film 131, it can be controlled more accurately.

Since the electrode film 13, which functions as a conductor, i.e., a plating seed film for passing plating current at the time of plating the plated magnetic film 14, is a laminated film of the Ru film 131 and the conductive magnetic film 132, it allows passage of sufficient plating current. Accordingly, there can be formed the plated magnetic film 14 of high-quality.

In order to reflect (110) orientation of the Ru film 131 constituting the electrode film 13 in the crystal orientation of the conductive magnetic film 132 and the plated magnetic film 14, the Ru film 131 preferably has a film thickness in the range of 0.75 nm to 5 nm. With this, there can be obtained the main magnetic pole film 40 having excellent soft magnetic properties.

Next the effects of the present invention will be concretely described with reference to the experimental data. It should be noted that in any of the experimental data, 100 sample pieces were used for each Sample.

<Relationship between Film Thickness of Ru Film and Coercive Force>

A Ti film having a film thickness of 1 (nm) was deposited by sputtering on an inner wall surface of an inverted trapezoidal recess 150 formed in a first non-magnetic film 15 made of alumina, and a Ru film 131 was similarly deposited thereon by sputtering, and furthermore a FeCo film having a film thickness of 10 (nm) was deposited on the surface of the Ru film 131 by sputtering. The Ti film corresponds to the adhesive film 122, while the FeCo film corresponds to the conductive magnetic film 132. Then, the film thickness of the Ru film 131 was varied for measuring the coercive forces Hce and Hch of the FeCo film 132 for each film thickness. The measurements are shown not only in Table 1 but also in FIG. 7. In Table 1 and FIG. 7, "Thickness (nm)" refers to a film thickness (nm) of the Ru film.

TABLE 1

| Sample No. | Thickness (nm) | Hce (Oe) | Hch (Oe) |
|---|---|---|---|
| 1 | 0 | 88 | 98 |
| 2 | 0.5 | 41 | 35 |
| 3 | 0.75 | 12 | 4 |
| 4 | 1.0 | 10 | 3 |
| 5 | 1.3 | 9 | 2 |
| 6 | 1.5 | 9 | 1 |
| 7 | 2.0 | 10 | 1 |
| 8 | 5.0 | 15 | 2 |
| 9 | 7.5 | 24 | 4 |
| 10 | 12.5 | 27 | 7 |

Figure 7:
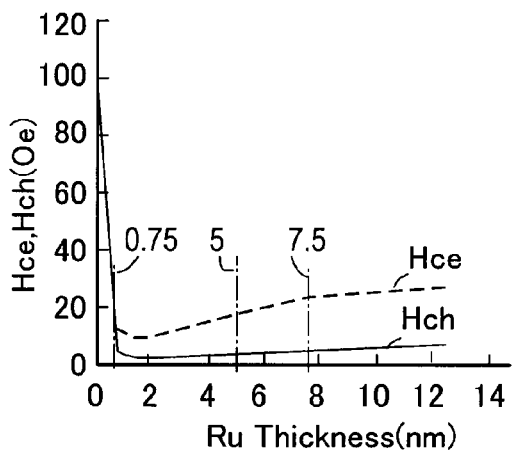
FIG. 7 is a diagram showing a relationship between the thickness of a Ru film and the coercive forces.

In Sample 1 not provided with the Ru film 131, referring to Table 1 and FIG. 7, the coercive force Hce was 88 (Oe) and the coercive force Hch was 98 (Oe), and it is understood that there was the problem of pole erase due to its extremely high coercive forces. Also in Sample 2 whose Ru film 131 had a film thickness of 0.5 (nm), the coercive force Hce was 41 (Oe) and the coercive force Hch was 35 (Oe), and although its coercive forces had decreased in comparison with Sample 1, it is understood that there was still the problem of pole erase.

In Samples 3 to 8 whose Ru film 131 had a film thickness ranging from 0.75 (nm) to 5 (nm), on the other hand, the coercive force Hce was in the range of 9 (Oe) to 15 (Oe) and the coercive force Hch was in the range of 1 (Oe) to 4 (Oe), and it is understood that there was obtained a significant effect of decreasing the coercive force.

The coercive force tended to increase gradually with increasing the film thickness of the Ru film 131 beyond 5 (nm), and in Sample 9 whose Ru film 131 had a film thickness of 7.5 (nm), the coercive force Hch was kept to a level as low as 4 (Oe), but the coercive force Hce rose to 24 (Oe). In Sample 10 whose Ru film 131 had a film thickness of 12.5 (nm), furthermore, the coercive force Hch was kept to a level as low as 7 (Oe), but the coercive force Hce rose to 27 (Oe). In consideration of this gradual increase characteristic, it is preferred that the upper limit of the film thickness of the Ru film 131 is set equal to or less than 5 (nm) (Samples 3 to 8). More specifically, the film thickness of the Ru film 131 is preferably in the range of 0.75 (nm) to 5 (nm) (Samples 3 to 8), more preferably in the range of 1.0 (nm) to 2.0 (nm) (Samples 4 to 7).

<Relationship Between Film Thickness of Main Magnetic Pole Film and Coercive Force>

In a magnetic head having the structure shown in FIGS. 1 to 6, an adhesive film 122 of 1 (nm) being a Ti film was deposited by sputtering on the inner wall surface of the inverted trapezoidal recess 150, and a Ru film 131 of 1.25 (nm) was deposited by sputtering on the surface of the adhesive film 122. Moreover, a conductive magnetic film 132 of 10 (nm) being a FeCo film was deposited by sputtering on the Ru film 131. Then, plating was performed using the Ru film 131 and the conductive magnetic film 132 as an electrode film 13, thereby depositing a plated magnetic film 14 on the conductive magnetic film 132. The plated magnetic film 14 was a FeCoNi film containing 62 wt. % of Fe, 35 wt. % of Co and 3 wt. % of Ni. By varying the film thickness of the plated magnetic film 14 upon plating, there were obtained Samples 11 to 14 having different film thicknesses. Samples 11 to 14 were measured for the coercive forces Hce and Hch.

For comparison, the plated magnetic film 14 was directly deposited by plating on the Ti film, which was intended to serve as the adhesive film 122, without forming the Ru film. By varying the film thickness of the plated magnetic film 14 upon plating, there were obtained Samples 15 to 18 having different film thicknesses. Samples 15 to 18 were measured for the coercive forces Hce and Hch. The measurements are shown in Table 2, while the coercive forces Hce and Hch are plotted in FIGS. 8 and 9, respectively. In Table 2 and FIGS. 8 and 9, "Thickness (nm)" refers to a film thickness (nm) of the plated magnetic film 14.

TABLE 2

| Sample No. | Electrode Film | Thickness (nm) | Hce (Oe) | Hch (Oe) |
|---|---|---|---|---|
| 11 | Ti/Ru/FeCo | 50 | 14.5 | 5.3 |
| 12 | Ti/Ru/FeCo | 100 | 14.1 | 3.7 |
| 13 | Ti/Ru/FeCo | 200 | 12.9 | 2.2 |
| 14 | Ti/Ru/FeCo | 500 | 10.3 | 1.4 |
| 15 | Ti/FeCo | 50 | 38.9 | 23.4 |
| 16 | Ti/FeCo | 100 | 32.6 | 20.0 |
| 17 | Ti/FeCo | 200 | 25.7 | 12.2 |
| 18 | Ti/FeCo | 500 | 17.1 | 5.1 |

Figure 8:
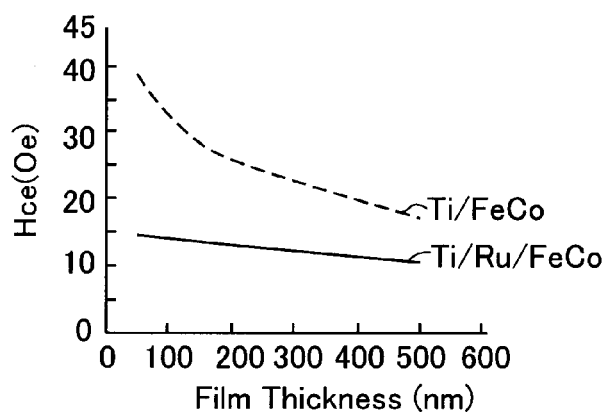
FIG. 8 is a diagram showing a relationship between the film thickness of a main magnetic pole film and the coercive force along an easy axis.
Figure 9:
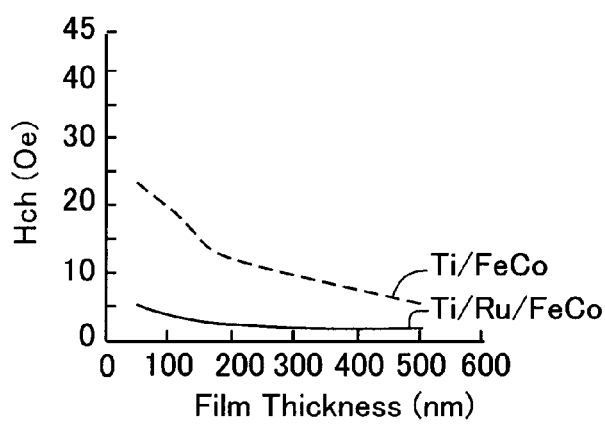
FIG. 9 is a diagram showing a relationship between the film thickness of a main magnetic pole film and the coercive force along a hard axis.

Referring to Table 2 and FIGS. 8 and 9, under the condition that the film thickness of the plated magnetic film was equal, Samples 11 to 14 provided with the Ru film were lower in both coercive forces Hce and Hch than Samples 15 to 18 not provided with the Ru film. However, the difference in coercive forces Hce and Hch between Samples 11 to 14 provided with the Ru film 131 and Samples 15 to 18 not provided with the Ru film 131 gradually decreased with increasing the film thickness of the plated magnetic film 14. This may be because the crystal orientation control over the plated magnetic film 14 with the Ru film 131 became less effective with increasing the film thickness of the plated magnetic film 14. Accordingly, the film thickness of the plated magnetic film 14 should be determined in consideration of the intended coercive forces Hce and Hch.

<Relationship between Film Thickness of Conductive Magnetic Film and Film Thickness of Plated Magnetic Film>

In a magnetic head having the structure shown in FIGS. 1 to 6, an adhesive film 122 of 1 (nm) being a Ti film was deposited by sputtering on the inner wall surface of the inverted trapezoidal recess 150, and a Ru film 131 having a film thickness of 1.25 (nm) was deposited by sputtering on the surface of the adhesive film 122. Moreover, a conductive magnetic film 132 being a FeCo film was deposited by sputtering on the Ru film 131. Then, plating was performed using the Ru film 131 and the conductive magnetic film 132 as an electrode film 13, thereby depositing a plated magnetic film 14 on the conductive magnetic film 132. The plated magnetic film 14 was a FeCoNi film containing 62 wt. % of Fe, 35 wt. % of Co and 3 wt. % of Ni.

By varying a film thickness Fx of the conductive magnetic film 132 upon sputter deposition and also varying a film thickness Fy of the plated magnetic film 14 upon plating, there were obtained Samples 21 to 26 having different film thicknesses Fx and Fy. The total film thickness of the magnetic film composed of the conductive magnetic film 132 and the plated magnetic film 14 was kept at 200 (nm), and the film thicknesses Fx and Fy were varied within the above range. Samples 21 to 26 were measured for the coercive forces Hce and Hch. The measurements are shown in Table 3, while the coercive forces Hce and Hch are plotted in FIGS. 10 and 11, respectively. In Table 3 and FIGS. 10 and 11, "Fy (nm)" refers to a film thickness (nm) of the plated magnetic film 14.

TABLE 3

| Sample No. | Fx (nm) | Fy (nm) | Hce (Oe) | Hch (Oe) |
|---|---|---|---|---|
| 21 | 50 | 150 | 12.4 | 2.0 |
| 22 | 75 | 125 | 13.2 | 2.1 |
| 23 | 100 | 100 | 13.2 | 2.0 |
| 24 | 125 | 75 | 13.3 | 2.3 |
| 25 | 150 | 50 | 14.0 | 1.7 |
| 26 | 200 | 0 | 14.9 | 1.2 |

Figure 10:
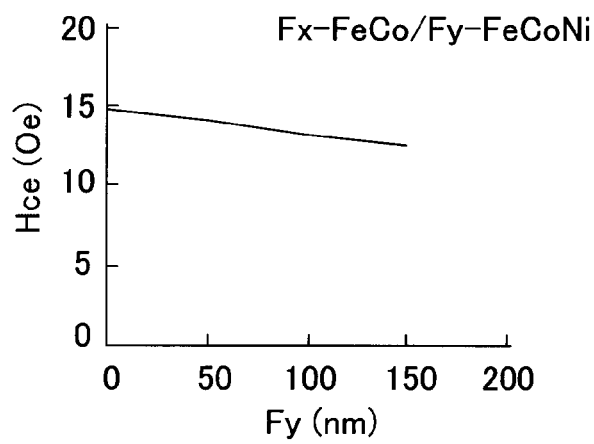
FIG. 10 is a diagram showing a relationship between the film thickness of a plated magnetic film and the coercive force along an easy axis.
Figure 11:
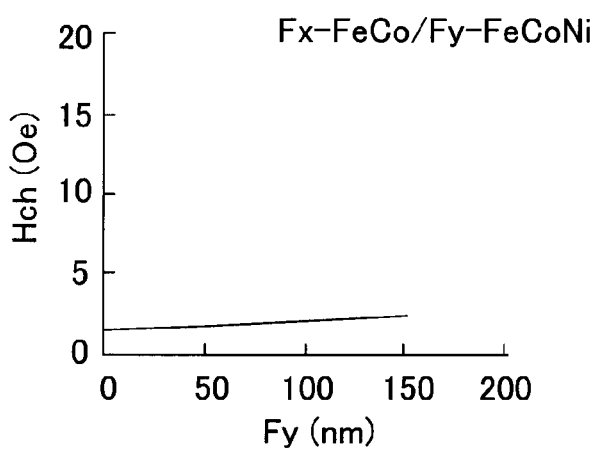
FIG. 11 is a diagram showing a relationship between the film thickness of a plated magnetic film and the coercive force along a hard axis.

Referring to Table 3 and FIGS. 10 and 11, under the condition that the total film thickness of the magnetic film was 200 (nm), the value of the coercive force Hce tended to decrease slightly but the value of the coercive force Hch tended to increase slightly with increasing the film thickness Fy of the plated magnetic film 14, but there was not much difference. This may be because under the above condition that the film thickness was 200 (nm), the crystal orientation control with the Ru film 131 could sufficiently affect the plated magnetic film 14. This means that the film thickness ratio of the conductive magnetic film 132 constituting the electrode film 13 to the plated magnetic film 14 can be appropriately determined not from the viewpoint of improving the coercive forces Hce and Hch but from other reasons such as efficiency of the production process, as long as the total film thickness of the magnetic film was equal to or less than 200 (nm). Table 3 and FIGS. 10 and 11 show data obtained for the case where the conductive magnetic film 132 was a FeCo film and the plated magnetic film 14 was a FeCoNi film, but the same results were obtained for the use of Ni80Fe20.

<Properties as Magnetic Head>

When used as a magnetic head, the above features are effective in improving the overwrite characteristic (OW) and suppressing the pole erase (PE). Table 4 shows data indicating the relationship between the film configuration of the electrode film and the overwrite characteristic (OW) and the pole erase (PE).

TABLE 4

| Sample No. | Electrode Film | Plated Magnetic Film | OW (dB) | PE/ Yield (%) | W1σ (nm) |
|---|---|---|---|---|---|
| 31 | Ti(1 nm)/FeCo(5 nm) | Fe62Co35Ni3 | 35.2 | 32 | 7-8 |
| 32 | Ti(1 nm)/FeCo(10 nm) | Fe62Co35Ni3 | 35.4 | 30 | 7-8 |
| 33 | Ti(1 nm)/Ru(10 nm) | Fe62Co35Ni3 | 34.9 | 100 | 10-11 |
| 34 | Ti(1 nm)/Ru(1.25 nm)/ FeCo(5 nm) | Fe62Co35Ni3 | 35.5 | 100 | 7-8 |
| 35 | Ti(1 nm)/Ru(1.25 nm)/ FeCo(10 nm) | Fe62Co35Ni3 | 35.4 | 100 | 7-8 |

Referring to Table 4, there was obtained an excellent overwrite characteristic (OW) equal to or greater than 34.9 (dB), and the overwrite characteristic 'OW' was not deteriorated by providing the Ru film 131. This is because the conductive magnetic film 132 adhered to the Ru film 131 functioned as a magnetic film equivalent to the plated magnetic film 14.

However, Samples 31 and 32 not provided with the Ru film had a poor pole erase yield (PE/Yield) of 32% and 30%, respectively. On the other hand, Samples 33 to 35 provided with the Ru film 131 had a pole erase yield (PE/Yield) of 100%. As has been described above, this is because the coercive forces Hce and Hch of the conductive magnetic film 132 and the plated magnetic film 14 were decreased by the effect of the crystal orientation control due to the Ru film 131. It should be noted that "pole erase yield (PE/Yield)" refers to a ratio of sample pieces free from pole erase.

Next regarding Sample 33 in which the film thickness of the Ru film 131 was set at 10 (nm) and the plated magnetic film 14 was directly plated thereon and Samples 34 and 35 in which the film thickness of the Ru film 131 was set at 1.25 (nm) and the plated magnetic film 14 was plated above it, the variation W1σ of the pole width W1 was smaller in Samples 34 and 35 than in Sample 33. This may be because in Sample 33, deposition of the plated magnetic film 14 on the Ru film 131 caused variation in the film thickness of the plated magnetic film 14. Decreasing the film thickness of the Ru film 131 seems to suppress the variation W1σ of the pole width W1 but will then decrease the sectional area of the electrode film, which makes it impossible to supply necessary plating current, thereby deteriorating the quality of the plated magnetic film.

In Samples 34 and 35, since the film thickness of the Ru film 131 was optimized and the conductive magnetic film 132 was deposited thereon, not only the conductive magnetic film 132 but also the plated magnetic film 14 was affected by the crystal orientation control based on (110) orientation of the Ru film 131, which could decrease the coercive forces Hce and Hch to eliminate the pole erase, and secure the sectional area of the main magnetic pole film to improve the overwrite characteristic (OW), and then supply sufficient plating current to reduce the variation of the pole width W1.

2. Method for Manufacturing the Magnetic Head

Next will be described a method for manufacturing the magnetic head according to the present invention with reference to FIGS. 12 to 23. The manufacturing method according to the present invention is particularly directed to a perpendicular recording head manufacturing method in the production process of the magnetic head. The processes before the production process of the perpendicular recording head have been known heretofore and do not require specific description. Roughly speaking, it can be manufactured by layering a series of components in order by using a conventional thin-film process including a film formation technique such as plating or sputtering, a patterning technique such as photolithography, an etching technique such as dry etching or wet etching, and a polishing technique such as CMP (chemical mechanical polishing).

Roughly speaking of the thin-film process with reference to FIGS. 1 to 6 and so on, when manufacturing the magnetic head, at first, the insulating film 2 is formed on the slider substrate 1, and then the lower read shield film 3, the shield gap film 4 embedded with the MR element 8, and the upper read shield film 30 (the upper read shield film portions 5, 7 and the non-magnetic film 6) are deposited on the insulating film 2 in the mentioned order, thereby forming the reproducing head 10A.

Subsequently, the separating film 9 is formed on the reproducing head 10A, and then the magnetic pole film 50 (the auxiliary magnetic pole film 10, the second non-magnetic film 12, and the main magnetic pole film 40) enclosed with the non-magnetic films 11, 15, the gap film 16, the coil film 18 covered with the insulating film 19, and the magnetic film 60 (the write shield film 17 and the return yoke film 20) are deposited on the separating film 9 in the mentioned order, thereby forming the recording head 100B. Finally, the overcoat film 21 is formed on the recording head 100B, and then the air bearing surface 70 is formed by using a machining process or a polishing process, thereby completing the magnetic head.

Figure 12:
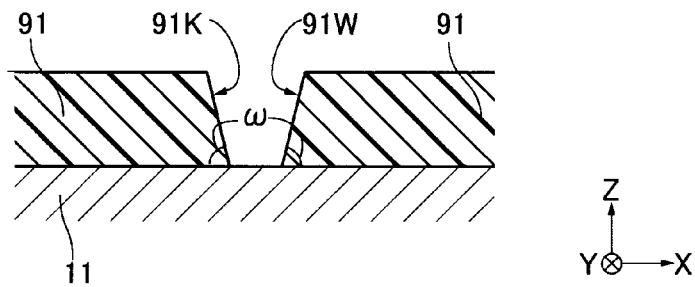
FIG. 12 is a view showing a step for manufacturing the magnetic head according to the present invention.

When manufacturing the perpendicular recording head of the magnetic head, which is the subject of the present invention, at first, after formation of the non-magnetic film 11, a resist pattern 91 is formed on the non-magnetic film 11 to have the recess 150, as shown in FIG. 12. Upon formation of the resist pattern 91, a resist film is formed by applying a resist onto the non-magnetic film 11 and then subjected to patterning (exposure and development) by using photolithography. In this case, exposure conditions are adjusted such that the recess 150 spreads with distance from the non-magnetic film 11 and an inclination ω of an inner wall 91W (or angle between the inner wall 91W and the surface of the non-magnetic film 11) is equal to the bevel angle θ (see FIG. 5).

Figure 13:
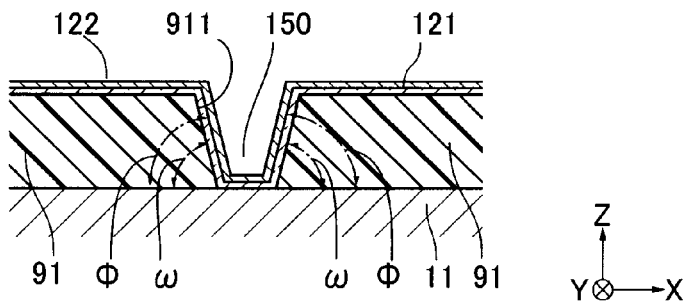
FIG. 13 is a view showing a step after the step shown in FIG. 12.

Thereafter, as shown in FIG. 13, the non-magnetic film 121 is formed in such a manner as to narrow the recess 150 by covering at least the inner wall surface 911 of the resist pattern 91 in the recess 150 using a dry film formation method.

Upon formation of the non-magnetic film 121, for example, the surface of the resist pattern 91 (including the inner wall surface 911) and the exposed surface of the non-magnetic film 11 in the recess 150 are covered using ALD. Particularly in this case, the film formation temperature (so-called substrate temperature) by ALD should be lower than the deformation temperature (or glass transition temperature) of the resist pattern 91. Since the use of ALD results in that the non-magnetic film 121 covers the inner wall surface 911 with an uniform thickness, an inclination Φ of the non-magnetic film 121 corresponding to the inner wall surface 911 is equal to the inclination ω. Then, the adhesive film 122 being a Ti film, for example, is formed on the surface of the non-magnetic film 121 by using sputtering.

Figure 14:
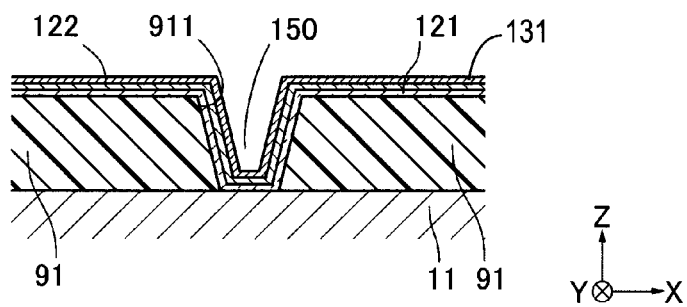
FIG. 14 is a view showing a step after the step shown in FIG. 13.

Then, as shown in FIG. 14, the Ru film 131 is formed by sputtering on the adhesive film 122. The Ru film 131 is adhered to the surface of the adhesive film 122 following the shape of the inner wall surface of the recess 150.

Figure 15:
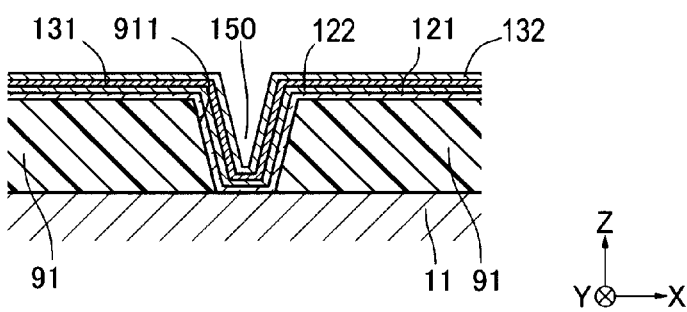
FIG. 15 is a view showing a step after the step shown in FIG. 14.

Subsequently, as shown in FIG. 15, the conductive magnetic film 132 is formed by sputtering on the surface of the Ru film 131. The conductive magnetic film 132 is adhered to the surface of the Ru film 131 with a substantially uniform thickness, thereby following the shape of the inner wall surface of the recess 150. The conductive magnetic film 132 contains at least Fe and Co among Fe, Co and Ni.

Figure 16:
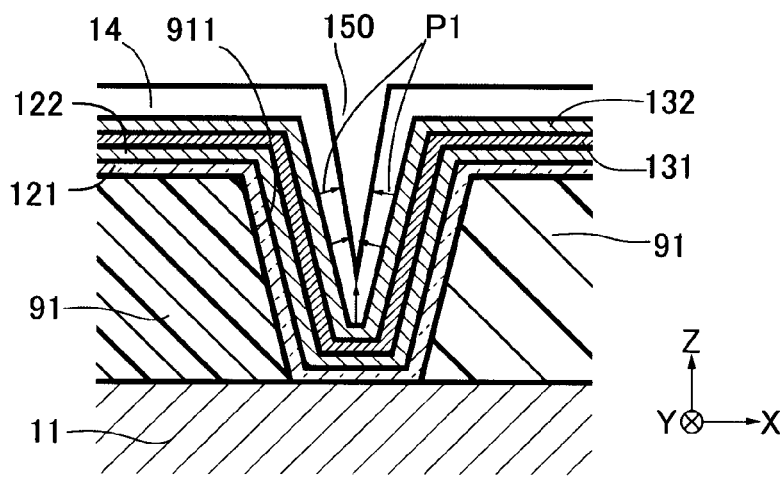
FIG. 16 is a view showing a step after the step shown in FIG. 15.

Next, the plated magnetic film 14 is grown in such a manner as to fill the recess 150 on the electrode film 13 by performing electroplating with the electrode film 13, which is composed of the Ru film 131 and the conductive magnetic film 132, used as a seed film, as shown in FIG. 16. With the above plating, the plated magnetic film 14 grows to fill up the recess 150, as shown in FIG. 17.

Figure 17:
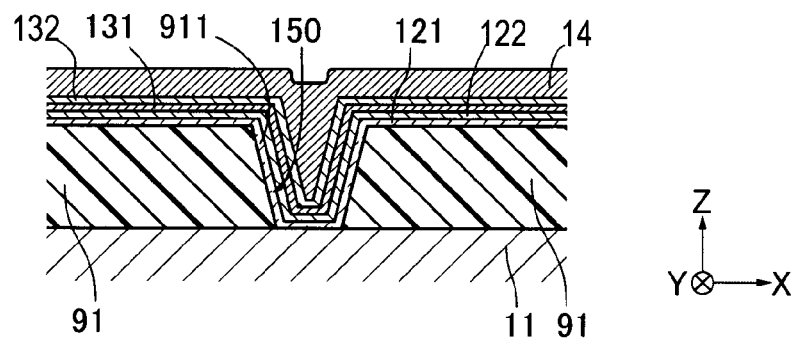
FIG. 17 is a view showing a step after the step shown in FIG. 16.

Here, as shown in FIG. 16, the plated magnetic film 14 grows toward the center from both the lateral faces of the recess 150, as indicated by arrows, whereby most of the plated magnetic film 14 filling up the recess 15 is made up by a plated film that has grown toward the center from both the lateral faces of the recess 150, as shown in FIG. 17. The plated magnetic film 14 that has grown toward the center from both the lateral faces of the recess 150 is strongly influenced by the crystal orientation control due to (110) orientation of the Ru film 131 lying on both the lateral faces of the recess 150. Therefore, there can be formed a magnetic film having a low coercive force.

Then, in order to effectively reflect (110) orientation of the Ru film 131 in the crystal orientation of the plated magnetic film 14, the Ru film 131 should have a film thickness in the range of 0.75 (nm) to 5 (nm), more preferably in the range of 0.75 (nm) to 2 (nm), as indicated in Table 1, FIG. 7 and so on.

This means that since the plated magnetic film 14 filling up the recess 150 is dominated by a film that has grown from both the lateral faces of the recess 150, it is important that the film thickness of the Ru film 131 within the recess 150, which serves as a small width portion, be set in the range of 0.75 (nm) to 5 (nm), more preferably in the range of 0.75 (nm) to 2 (nm), so that the magnetic pole can be formed from the plated magnetic film 14 of a low coercive force with (110) orientation of the Ru film 131 reflected in the crystal orientation of the plated magnetic film 14.

The preferred material and composition of the plated magnetic film 14 are as described above. For confirmation, the plated magnetic film 14 contains at least Fe and Co among Fe, Co and Ni and preferably has a composition in the range of 40 at. % $\leq$ Fe $\leq$ 80 at. %, 20 at. % $\leq$ Co $\leq$ 60 at. %, and 0 at. % $\leq$ Ni $\leq$ 5 at. %. With the above composition, there can be obtained the main magnetic pole film 40 with a saturation magnetic flux density equal to or greater than 2.3 T.

Figure 18:
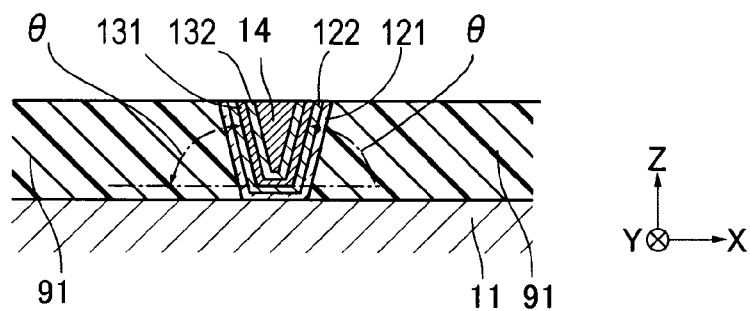
FIG. 18 is a view showing a step after the step shown in FIG. 17.

Then, the non-magnetic film 121, the electrode film 13 and the plated magnetic film 14 are selectively removed until at least the resist pattern 91 is exposed, thereby forming the main magnetic pole film 40 as a magnetic film pattern to fill the recess 150 where the non-magnetic film 121 is formed, as shown in FIG. 18. Upon removing the non-magnetic film 121, the electrode film 13 and the plated magnetic film 14, for example, a polishing method such as CMP or an etching method such as ion milling or reactive ion etching (RIE) may be adopted. Upon formation of the main magnetic pole film 40, the bevel angle $\theta$ is set equal to the inclination $\Phi$ of the non-magnetic film 121, and in other words, the bevel angle $\theta$ is set equal to the inclination $\omega$ of the resist pattern 91.

Figure 19:
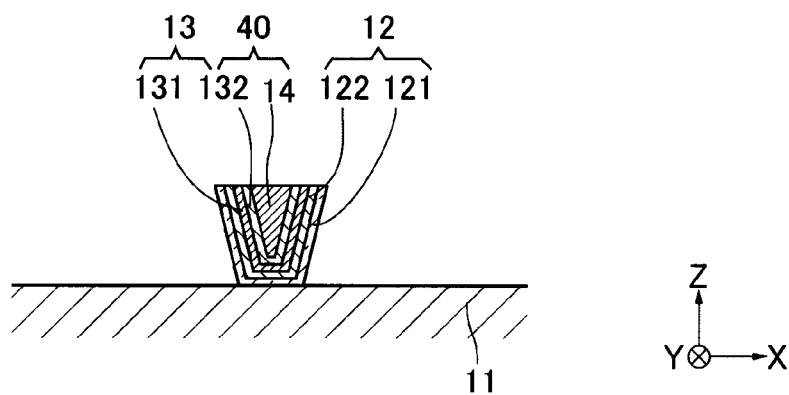
FIG. 19 is a view showing a step after the step shown in FIG. 18.
Figure 20:
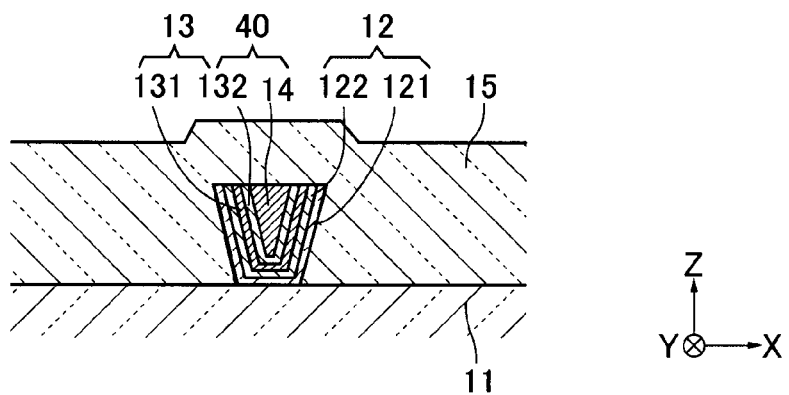
FIG. 20 is a view showing a step after the step shown in FIG. 19.
Figure 21:
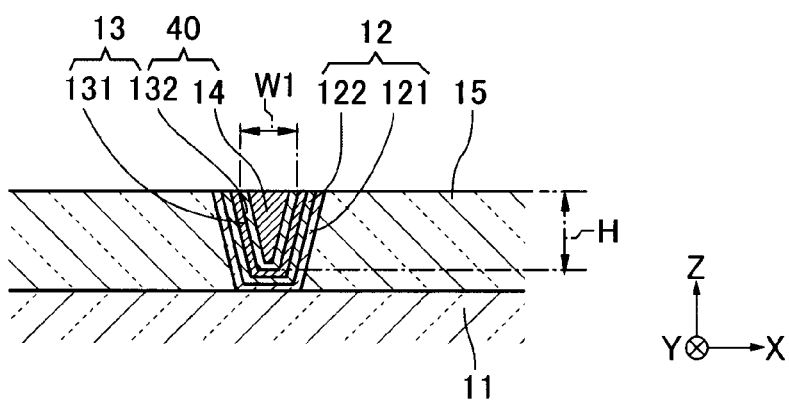
FIG. 21 is a view showing a step after the step shown in FIG. 20.

Then, after the remaining resist pattern 91 is removed by using washing with an organic solvent or ashing, as shown in FIG. 19, the first non-magnetic film 15 is formed, for example, by using sputtering to cover the non-magnetic film 121 and the main magnetic pole film 40, as shown in FIG. 20. Subsequently, the first non-magnetic film 15 is selectively removed (polished) until at least the non-magnetic film 121 and the main magnetic pole film 40 are exposed, for example, by using CMP, thereby flattening the non-magnetic film 121, the main magnetic pole film 40 and the first non-magnetic film 15, as shown in FIG. 21. In the polishing process, the polishing amount should be adjusted, for example, to set the width W1 and the height H of the main magnetic pole film 40 to desired values.

Finally, the air bearing surface 70 is formed at the next step, thereby forming the end face 40M of the main magnetic pole film 40 and the end face 60M of the magnetic film 60. Upon formation of the air bearing surface 70, the difference in hardness between the main magnetic pole film 40 and the first and second non-magnetic films 15, 12 is utilized, for example, by adjusting processing conditions such as polishing conditions, so that the non-magnetic film 121 recedes from the first non-magnetic film 15 and the main magnetic pole film 40 projects from the non-magnetic film 121 to have the end face 40M flush with the air bearing surface 70, as shown in FIG. 5.

It should be noted that although in the present embodiment, the determination of the width W1 and the height H of the main magnetic pole film 40 is carried out by using a polishing process at the time of polishing the first non-magnetic film 15, but is not necessarily limited thereto. For example, the width W1 and the height H may be determined by using a polishing process at the time of forming the plated magnetic film 14 or the like. Also in this case, the same effects can be obtained.

Figure 22:
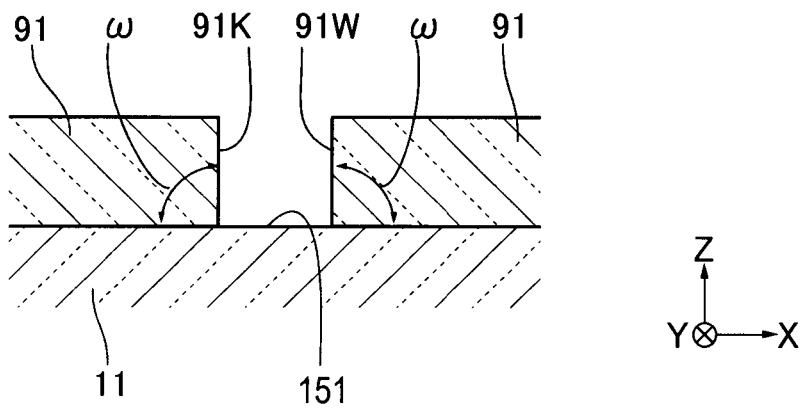
FIG. 22 is a view showing an another step for manufacturing the magnetic head.
Figure 23:
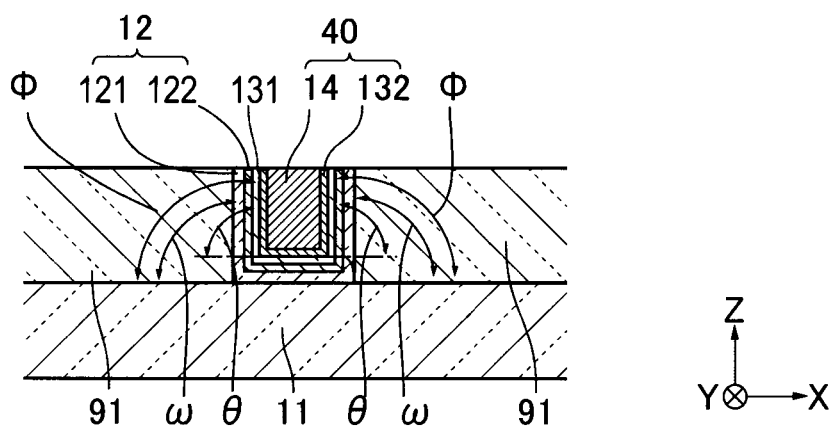
FIG. 23 is a view showing a step after the step shown in FIG. 22.

Although in the foregoing embodiments, the main magnetic pole film 40 is formed to have an inverted trapezoid cross-section by forming the resist pattern 91 with the inner wall surface 911 inclined with respect to the surface of the non-magnetic film 11 (the inclination $\omega$<90 degrees), but is not necessarily limited thereto. For example, as shown in FIGS. 22 and 23, the main magnetic pole film 40 may be formed to have a rectangular cross-section by forming the resist pattern 91 with the inner wall surface 911 normal to the surface of the non-magnetic film 11 (the inclination $\omega$=90 degrees). Also in this case, the same effects can be obtained.

3. Head Assembly

The present invention further discloses a head assembly. The head assembly includes the foregoing magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (or gimbal) and an HAA (head arm assembly) in which the HGA is mounted on an arm.

Figure 24:
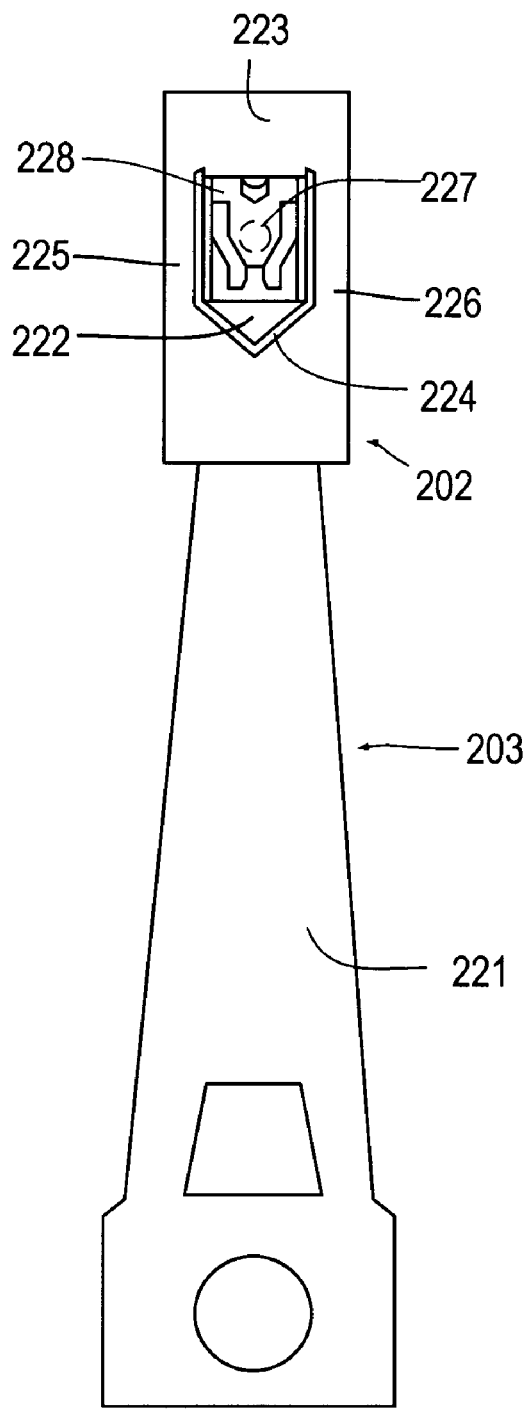
FIG. 24 is a plan view of an HGA according to the present invention.
Figure 25:
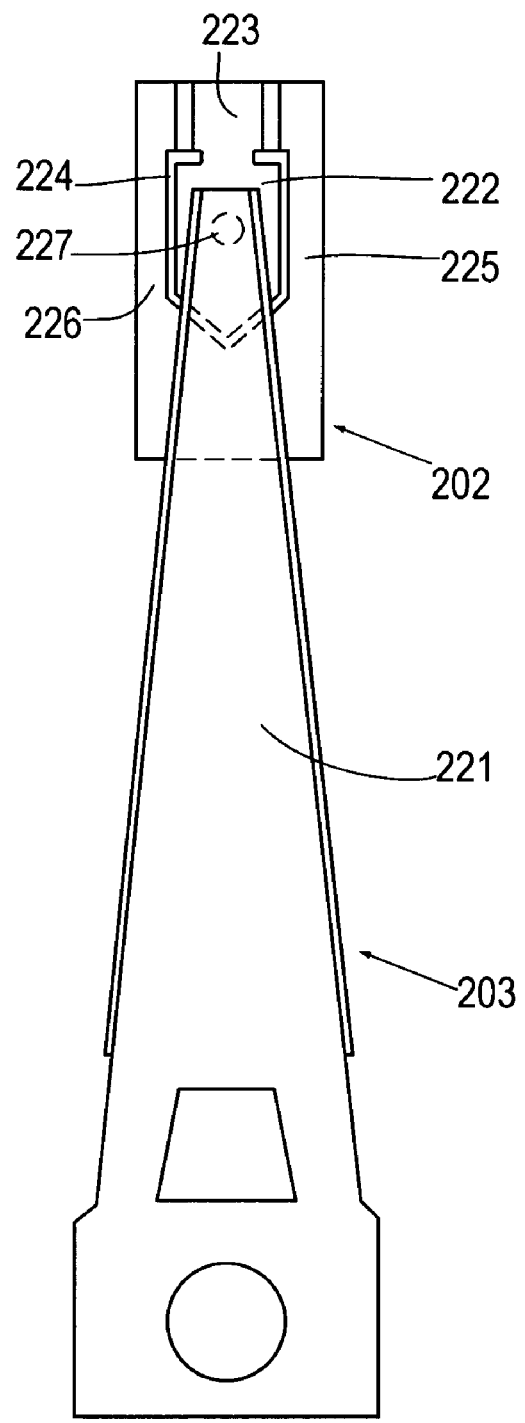
FIG. 25 is a bottom view of the HGA shown in FIG. 24.

FIG. 24 is a front view of a head assembly according to the present invention, and FIG. 25 is a bottom view of the head assembly shown in FIG. 24. The illustrated head assembly is an HGA including a suspension 203 and a magnetic head 228. The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The magnetic head 228 is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the tongue portion 222 and the outer frame portions 225, 226, extending around the tongue portion 222. The magnetic head 228 is attached to one side of the tongue portion 222 through an adhesive or the like to be in spring contact with the tip of the load dimple 227.

One face of the magnetic head 228 opposite to the air bearing surface of the slider is attached to the tongue portion 222 of the suspension 203. Flexible leads and the like not shown in the drawings are connected to the magnetic head 228.

Figure 26:
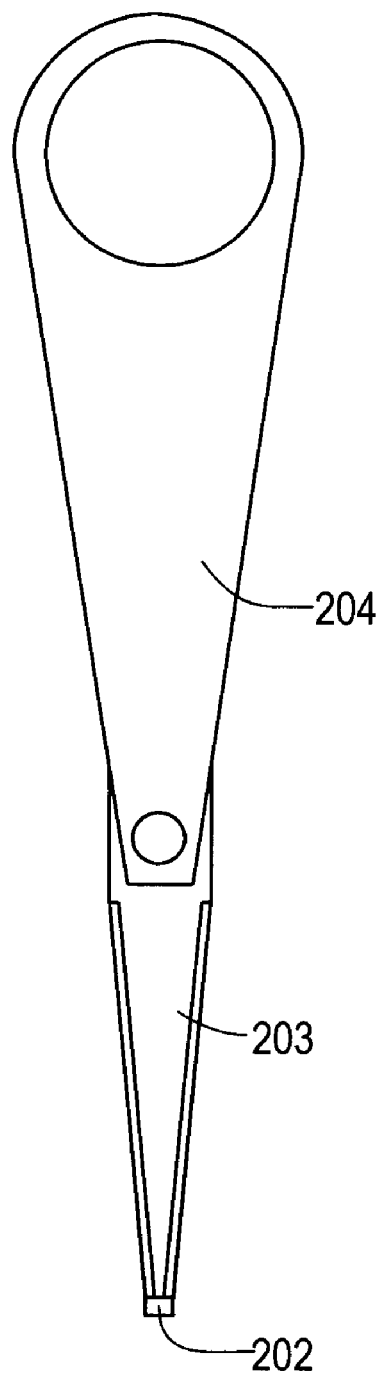
FIG. 26 is a plan view of an HAA according to the present invention.

FIG. 26 is a front view of an HAA. The illustrated HAA includes the suspension 203, the magnetic head 228 and an arm 204. The arm 204 is integrally formed of a suitable non-magnetic metallic material such as an aluminium alloy. The arm 204 is provided with a mounting hole. The mounting hole is used for mounting on a positioning device provided in a magnetic disk apparatus. One end of the suspension 203 is secured to the arm 204, for example, with a ball connecting structure.

4. Magnetic Recording/Reproducing Apparatus

Figure 27:
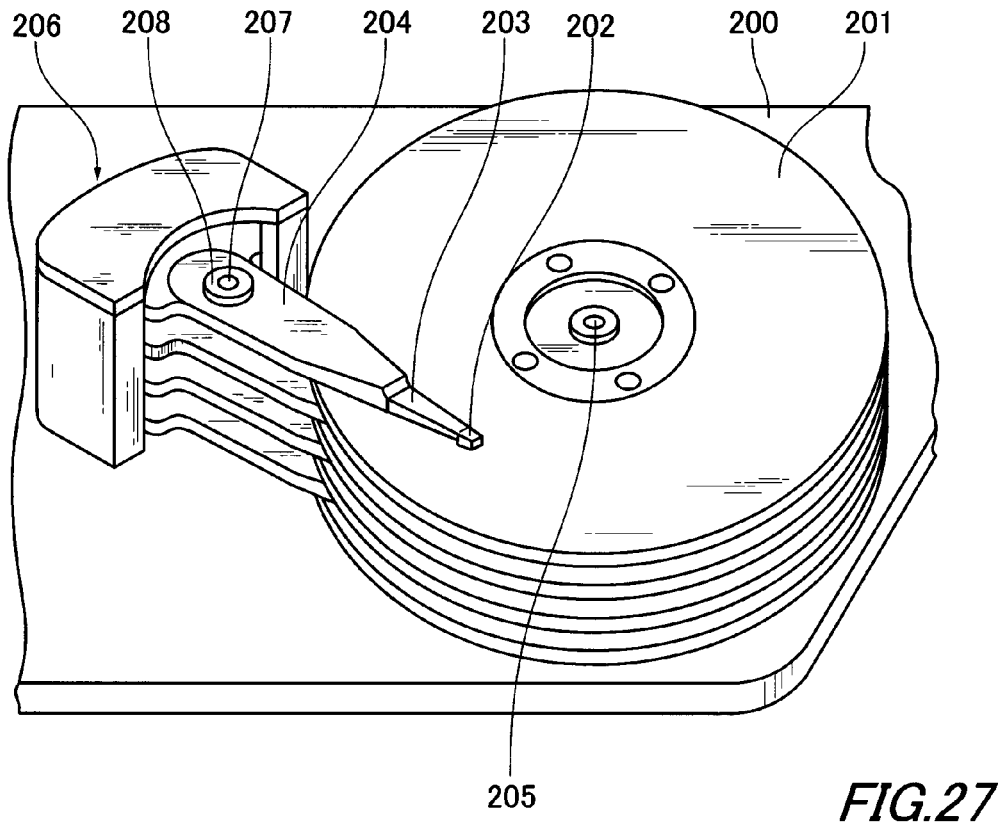
FIG. 27 is a perspective view of a magnetic recording apparatus according to the present invention.

Next will be described a structure of a magnetic recording apparatus mounted with the magnetic head according to the present invention. FIG. 27 shows the structure of the magnetic recording apparatus. The magnetic recording apparatus, which is mounted with the foregoing magnetic head, is, for example, a hard disk drive.

As shown in FIG. 27, for example, the magnetic recording apparatus includes, within a case 200, a plurality of magnetic disks (e.g., hard disks) 201 corresponding to the recording medium 80 for magnetically recording information, a plurality of suspensions 203 disposed corresponding to the respective magnetic disks 201 and supporting the magnetic heads at their one ends, and a plurality of arms 204 supporting the other ends of the suspensions 203. The magnetic disks 201 are rotatable about a spindle motor 205 which is fixed to the case 200. The arms 204 are connected to an actuator 206 which functions as a power source and are pivotable through a bearing 208 about a fixed shaft 207 which is fixed to the case 200.

The actuator 206 is constructed to include, for example, a driving source such as a voice coil motor. For example, the magnetic recording apparatus is a model where the plurality of arms 204 are pivotable about the fixed shaft 207 in an integrated manner. In FIG. 27, the case 200 is shown partially cut-out to make it easy to see the internal structure of the magnetic recording apparatus.

The magnetic head 228 is a magnetic head according to the present invention. When the magnetic disk 201 rotates for recording or reproducing information, an air flow generated between the recording surface (or magnetic head-facing surface) of the magnetic disk 201 and the air bearing surface 70 is utilized to let the magnetic head take off from the recording surface of the magnetic disk 201.

As shown in FIG. 27, the recording medium 80 includes, for example, a magnetization film 81 and a soft magnetic film 82 disposed close to and remote from the magnetic head, respectively. The magnetization film 81 functions to magnetically record information, while the soft magnetic film 82 functions as a path of a magnetic flux (so-called flux path) in the recording medium 80. The recording medium 80 of this type is generally called "double layer recording medium" for perpendicular recording. Needless-to-say, the recording medium 80 may include another layer, for example, in addition to the above magnetization film 81 and soft magnetic film 82.

The upwardly directed arrow shown in FIG. 27 indicates the moving direction M along which the recording medium 80 relatively moves with respect to the magnetic head. Assuming that the movement of the recording medium 80 moving in the moving direction M is a kind of flow, the foregoing "trailing side" refers to a flow-out side (or front side in the moving direction M), and particularly in this case, refers to an upper side in the thickness direction (Z-axis direction). On the other hand, a flow-in side (or rear side in the moving direction M) is referred to as "leading side", and particularly in this case, corresponds to a lower side in the thickness direction. The upper end edge E1, which is a recording portion of the main magnetic pole film 40, is called "trailing edge TE", and its width W1 is called "trailing edge width".

Figure 28:
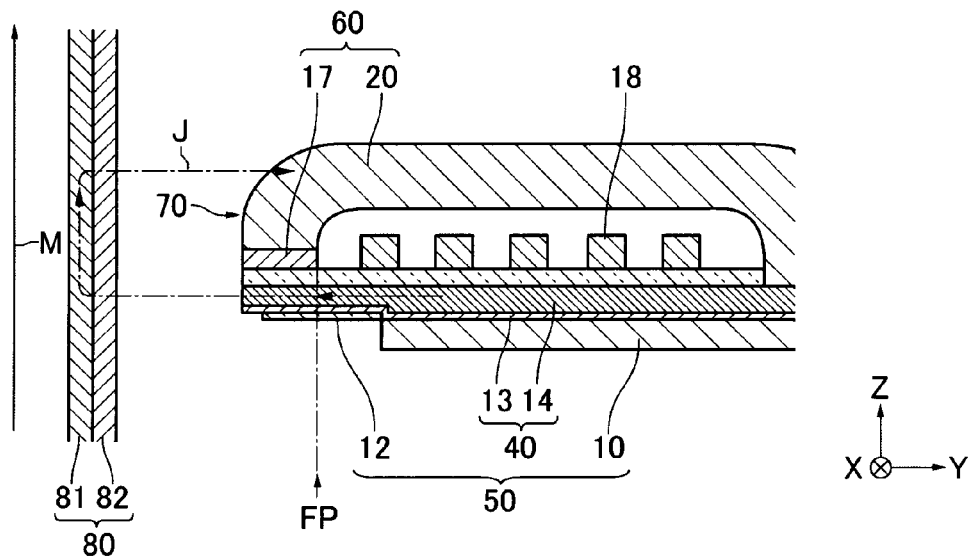
FIG. 28 is a view illustrating recording operation of the magnetic recording/reproducing apparatus shown in FIG. 27.

Recording and reproducing operations to be performed by the above magnetic recording/reproducing apparatus will be described with reference to FIG. 28. When recording information, specifically, a recording magnetic flux J is generated as a current flows from an external circuit not shown in the drawings to the coil film 18 of the recording head 100B. After absorbed in the auxiliary magnetic pole film 10 and the main magnetic pole film 40 of the magnetic pole film 50, the magnetic flux J flows toward the small width portion 40A. At this time, since the magnetic flux J is focused because of narrowing at the flare point FP, it is finally concentrated in the vicinity of the trailing edge TE. When the magnetic flux J concentrated in the vicinity of the trailing edge TE is emitted to generate a perpendicular magnetic field, the magnetization film 81 is magnetized by the perpendicular magnetic field, thereby magnetically recording information on the recording medium 80.

In this case, the gradient of the perpendicular magnetic field increases because the spreading component of the magnetic flux J is absorbed in the write shield film 17. The magnetic flux J absorbed in the write shield film 17 is resupplied to the magnetic pole film 50 through the return yoke film 20.

After magnetization of the magnetization film 81, the magnetic flux J emitted from the magnetic pole film 50 toward the recording medium 80 is absorbed in the return yoke film 20 through the soft magnetic film 82. At this time, a part of the magnetic flux J is also absorbed in the write shield film 17. The magnetic flux J absorbed in the write shield film 17 and the return yoke film 20 is also resupplied to the magnetic pole film 50. This enables circulation of the magnetic flux J between the recording head 100B and the recording medium 80.

In the magnetic head according to the present invention, moreover, since the crystal grain size is small even at the trailing edge TE important for writing, it can contribute to resolving the problem of increase in the coercive force due to increase in the crystal grain size.

When reproducing information, on the other hand, as a sense current flows through the MR element 8 of the reproducing head 100A, the resistance value of the MR element 8 changes depending on the reproducing signal magnetic field from the recording medium 80. Information recorded on the recording medium 80 can be magnetically reproduced by detecting the resistance change as a voltage change.

Since the magnetic recording apparatus is mounted with the foregoing magnetic head, the operating characteristics of the magnetic recording apparatus can be stabilized and the production process can be performed with high accuracy and simplified.

The present invention has been described in detail above with reference to preferred embodiments. However, obviously those skilled in the art could easily devise various modifications of the invention based on the technical concepts underlying the invention and teachings disclosed herein.

What is claimed is:

1. A magnetic head comprising a slider and a perpendicular recording head, wherein said perpendicular recording head includes a main magnetic pole film for emitting a perpendicular magnetic field and is supported by said slider, said main magnetic pole film includes an electrode film and a plated magnetic film and is disposed within a recess formed in a first non-magnetic film, said electrode film includes a Ru film and a conductive magnetic film, said Ru film is adhered to an inner wall surface of said recess or a surface of a second non-magnetic film adhered thereto, thereby following a shape of said inner wall surface of said recess, said conductive magnetic film is adhered to a surface of said Ru film, thereby following the shape of said inner wall surface of said recess, and said plated magnetic film is disposed adjacent said conductive magnetic film, thereby filling up said recess, wherein said Ru film has a film thickness in the range of 0.75 nm to 5 nm and a crystal orientation (110).

2. The magnetic head of claim 1, wherein said Ru film has a substantially uniform film thickness.

3. The magnetic head of claim 1, which further comprises a reproducing head.

4. The magnetic head of claim 1, wherein said conductive magnetic film contains at least Fe and Co, and optionally Ni.

5. The magnetic head of claim 1, wherein said plated magnetic film contains at least Fe and Co, and optionally Ni.

6. The magnetic head of claim 1, wherein said plated magnetic film has a saturation magnetic flux density (Bs) equal to or greater than 2.3 T.

7. The magnetic head of claim 1, wherein said Ru film is formed on a surface of a Ti film.

8. A head assembly comprising a magnetic head and a head support device
wherein said magnetic head includes a slider and a perpendicular recording head,
said perpendicular recording head includes a main magnetic pole film for emitting a perpendicular magnetic field and is supported by said slider,
said main magnetic pole film includes an electrode film and a plated magnetic film and is disposed within a recess formed in a first non-magnetic film,
said electrode film includes a Ru film and a conductive magnetic film,
said Ru film is adhered to an inner wall surface of said recess or a surface of a second non-magnetic film adhered thereto, thereby following a shape of said inner wall surface of said recess,
said conductive magnetic film is adhered to a surface of said Ru film, thereby following the shape of said inner wall surface of said recess,
said plated magnetic film is disposed adjacent said conductive magnetic film, thereby filling up said recess, and
said head support device supports said magnetic head in such a manner as to permit rolling and pitching of said magnetic head,
wherein said Ru film has a film thickness in the range of 0.75 nm to 5 nm and a crystal orientation (110).

9. The head assembly of claim 8, which further comprises a reproducing head.

10. A magnetic recording/reproducing apparatus comprising a head assembly and a magnetic recording medium,
wherein said head assembly includes a magnetic head and a head support device,
said magnetic head includes a slider and a perpendicular recording head,
said perpendicular recording head includes a main magnetic pole film for emitting a perpendicular magnetic field and is supported by said slider,
said main magnetic pole film includes an electrode film and a plated magnetic film and is disposed within a recess formed in a first non-magnetic film,
said electrode film includes a Ru film and a conductive magnetic film,
said Ru film is adhered to an inner wall surface of said recess or a surface of a second non-magnetic film adhered thereto, thereby following a shape of said inner wall surface of said recess,
said conductive magnetic film is adhered to a surface of said Ru film, thereby following the shape of said inner wall surface of said recess,
said plated magnetic film is disposed adjacent said conductive magnetic film, thereby filling up said recess,
said head support device supports said magnetic head in such a manner as to permit rolling and pitching of said magnetic head, and
said head assembly cooperates with said magnetic recording medium to record magnetic data on said magnetic recording medium,
wherein aid Ru film has a film thickness in the range of 0.75 nm to 5 nm and a crystal orientation (110).

11. The magnetic recording/reproducing apparatus of claim 10, which further comprises a reproducing head.

* * * * *